United States Patent [19]

Machida et al.

[11] Patent Number: 5,735,244
[45] Date of Patent: Apr. 7, 1998

[54] ENGINE CONTROL APPARATUS

[75] Inventors: Kenichi Machida; Hajime Hosoya, both of Atsugi, Japan

[73] Assignee: Unisia Jecs Corporation, Kanagawa-ken, Japan

[21] Appl. No.: 795,177

[22] Filed: Feb. 4, 1997

[30] Foreign Application Priority Data

Feb. 13, 1996 [JP] Japan ................. 8-025691

[51] Int. Cl.$^6$ ................................ F02D 41/34
[52] U.S. Cl. ................................ 123/399
[58] Field of Search .................. 123/399, 478, 123/492, 493

[56] References Cited

U.S. PATENT DOCUMENTS

| | | | |
|---|---|---|---|
| 4,227,507 | 10/1980 | Takase et al. | 123/492 |
| 4,759,329 | 7/1988 | Nobuo et al. | 123/399 |
| 4,953,530 | 9/1990 | Manaka et al. | 123/399 |
| 5,209,207 | 5/1993 | Shitani et al. | 123/399 |
| 5,282,450 | 2/1994 | Uchida et al. | 123/399 |
| 5,443,594 | 8/1995 | Takada et al. | 477/98 |
| 5,638,790 | 6/1997 | Minowa et al. | 123/399 |

FOREIGN PATENT DOCUMENTS 2 280 048  1/1995  United Kingdom.

Primary Examiner—Thomas N. Moulis
Attorney, Agent, or Firm—Lowe, Price, LeBlanc & Becker

[57] ABSTRACT

With engine control apparatus for controlling a throttle opening and fuel injection quantity in order to realize a target engine torque according to the present invention, in the case where a target air-fuel ratio is changed in accordance with a change in the target engine torque, erroneous control of the fuel injection quantity is prevented.

To achieve this, a target fuel quantity and a target air-fuel ratio are set based on the target engine torque, and a target air quantity is computed from the target fuel quantity and the target air fuel ratio. A target throttle opening is then computed based on the target air quantity, to control an electrically controlled throttle valve. Meanwhile, an actual air quantity detected by an air flow meter is smoothed, and a cylinder charge air quantity computed. The target air-fuel ratio is then corrected using a ratio of the cylinder charge air quantity to the target air quantity. A target fuel injection quantity is then computed from the cylinder charge air quantity and a post correction target air-fuel ratio, to control a fuel injector.

5 Claims, 10 Drawing Sheets

ENGINE CONTROL APPARATUS

TECHNICAL FIELD

The present invention relates to an engine control apparatus for controlling throttle opening and fuel injection quantity in order to realize a target engine torque.

BACKGROUND ART

Heretofore, such engine control has been referred to as torque demand control, and involves setting a target fuel quantity based on target engine torque, and simultaneously setting a target air-fuel ratio.

A target air quantity is then computed from the target fuel quantity and the target air-fuel ratio, and a target throttle opening set based on this target air quantity. An electrically controlled throttle valve is then controlled to give this target throttle opening.

Moreover, the actual air quantity controlled by the electrically controlled throttle valve is detected by an air flow meter, and a target fuel injection quantity then calculated from the actual air quantity and the target air-fuel ratio. A fuel injector is then controlled to give this target fuel injection quantity.

With this conventional engine control apparatus however, there are the following problems (refer to FIG. 10).

If the target engine torque is changed in steps, for example to increase, and the target air quantity is changed in steps to follow this change, a response delay occurs for the actual throttle opening (actual TVO) relative to the target throttle opening (target TVO). Hence the actual air quantity at this time does not achieve the target air quantity.
[8]69]

Therefore, in the case where the target air-fuel ratio is changed in steps following a stepwise change in the target engine torque, even though the target fuel injection quantity is determined and controlled from the actual air quantity and the target air-fuel ratio, a lean spike occurs in the actual air-fuel ratio due to the response delay of the electrically controlled throttle valve and collector error, followed by a rich spike due to air flow meter overshoot. Hence due to this excessive or deficient fuel injection quantity, the target engine torque cannot be achieved.

In view of the above heretofore encountered problems with engine control apparatus for controlling throttle opening and fuel injection quantity in order to realize a target engine torque, it is an object of the present invention to prevent erroneous control of the fuel injection quantity, in the case when, at the time of a change in the target engine torque, this is accompanied by a change in target air-fuel ratio.

DISCLOSURE OF THE INVENTION

The present invention provides an arrangement incorporating: a target fuel quantity setting device for setting a target fuel quantity based on a target engine torque; a target air-fuel ratio setting device for setting a target air-fuel ratio based on a target engine torque; a target air quantity computing device for computing a target air quantity from the target fuel quantity and the target air-fuel ratio; a target throttle opening computing device for computing a target throttle opening based on the target air quantity; a throttle control device for controlling a throttle valve to give a target throttle opening; an actual air quantity detection device for detecting an actual air quantity controlled by the throttle valve; a target fuel injection quantity computing device for computing a target fuel injection quantity from the actual air quantity and the target air-fuel ratio; and a fuel injection control device for controlling a fuel injector to give a target fuel injection quantity.

Furthermore, there is provided a target air-fuel ratio correction device for correcting the target air-fuel ratio input to the target fuel injection quantity computing device, based on a relationship between the actual air quantity and the target air quantity.

In this way in the case when, at the time of a change in the target engine torque, this is accompanied by a change in the target air-fuel ratio, then by correcting the target air-fuel ratio based on a relationship between the actual air quantity and the target air quantity, the phases of the actual air quantity and the target air-fuel ratio can be matched, thereby preventing erroneous control of the fuel injection quantity. Hence the target engine torque can be realized even during transitional operation.

Here for the relationship between the actual air quantity and the target air quantity, the ratio between the actual air quantity and the target air quantity is the most convenient, and hence preferable.

Moreover, the target air-fuel ratio correction device, at the time of changing the target air-fuel ratio from the target air-fuel ratio setting device, preferably changes a post correction target air-fuel ratio tA/Fi based on a change amount $\Delta tA/F$ thereof and a ratio R of the actual air quantity to the target air quantity, according to the equation:

$$tA/Fi = tA/Fi + \Delta tA/F \times R$$

By changing the target air-fuel ratio in this way, by adding thereto the product of the step change amount of the target air-fuel ratio and the ratio of the actual air quantity to the target air quantity, then the phases of the actual air quantity and the target air-fuel ratio can be accurately matched.

Moreover, an actual air quantity smoothing device may be provided for smoothing the actual air quantity detected by the actual air quantity detection device over a time-lag of first order, and converting this to a value corresponding to the cylinder charge air quantity.

By smoothing the actual air quantity for the throttle valve section in this way, over a time-lag of first order, and converting this to a value corresponding to the cylinder charge air quantity, and then using this value, then the actual air quantity can be more accurately determined.

With the target air-fuel ratio correction device, instead of correction based on the relationship between the actual air quantity and the target air quantity, correction may be based on a relationship between the actual throttle opening and the target throttle opening.

In this case, by correcting the target air-fuel ratio based on the relationship (in particular the ratio) between the actual throttle opening and the target throttle opening, the phases of the actual throttle opening and the target air-fuel ratio can be matched, thereby preventing erroneous control. Hence an approximately similar effect can be obtained. Characteristic configurations of the present invention, and operation and effects based thereon, will become more clear from the following embodiments.

BEST MODE FOR CARRYING OUT THE INVENTION

Figure 1:
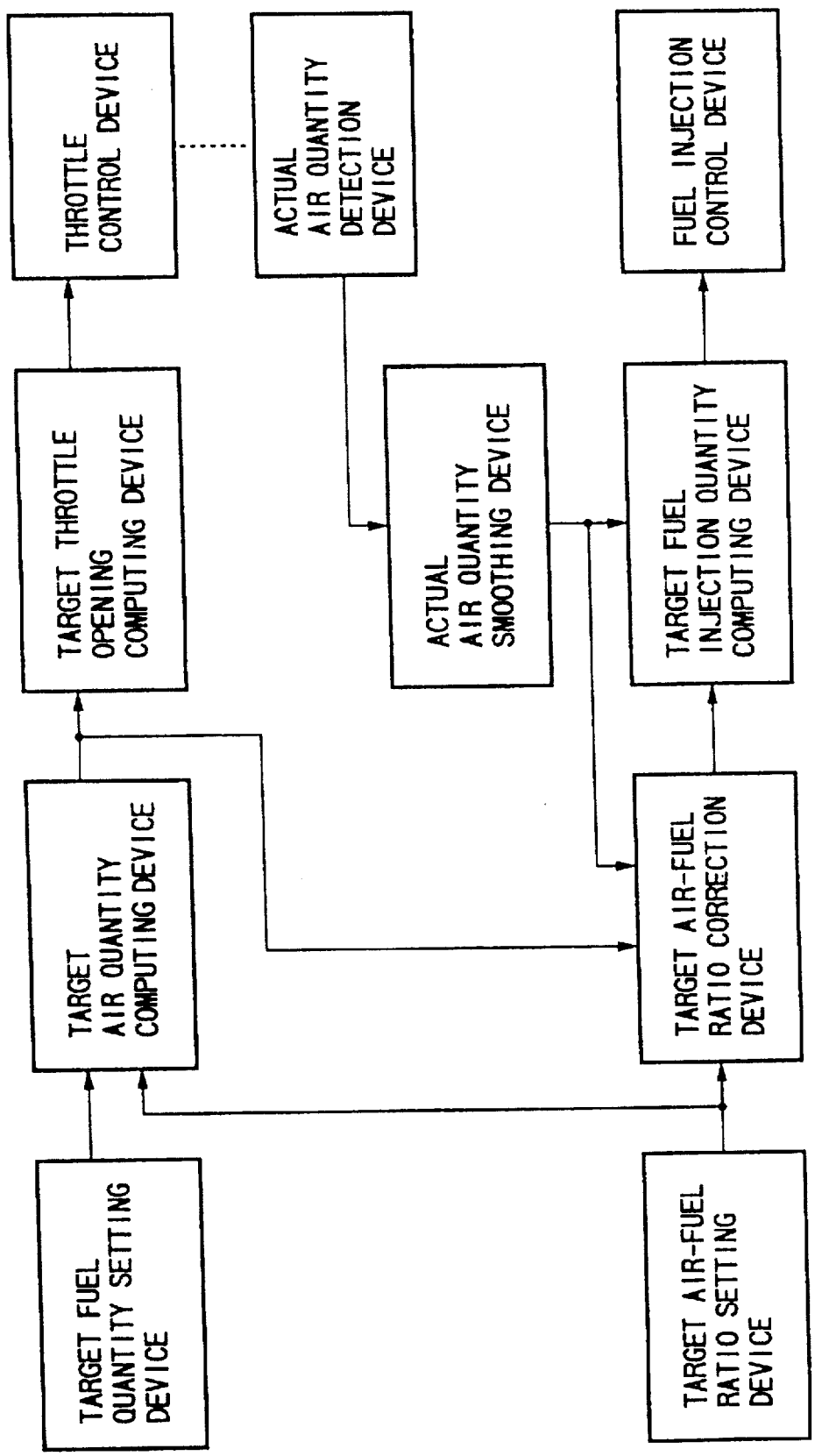
FIG. 1 is a block diagram showing a basic configuration of the present invention.

A basic configuration of an engine control apparatus according to the present invention is shown in FIG. 1. Embodiments are described hereunder with reference to FIG. 2 through FIG. 9.

Figure 2:
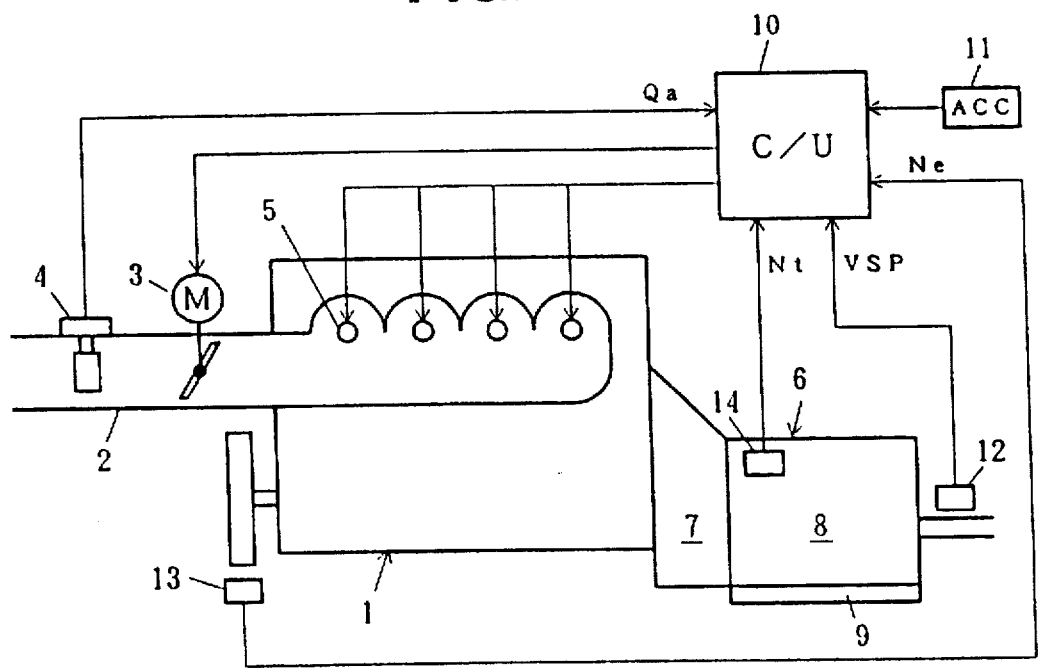
FIG. 2 is a system diagram showing one embodiment of the present invention.

FIG. 2 shows a system configuration.

An electrically controlled throttle valve 3 driven by a step motor M, is provided in an intake passage 2 of an engine 1. An opening of the throttle valve 3 is controlled by a command signal from a control unit 10, to thereby control air quantity. A hot wire type air flow meter 4 is provided upstream of the throttle valve 3, to thereby detect an actual air quantity (mass flow rate) Qa.

Respective solenoid type fuel injectors 5 are provided in branch portions of an intake manifold for the respective cylinders, downstream of the throttle valve 3 in the intake passage 2. The fuel injectors 5 are powered open by a drive pulse signal output from the control unit 10 at a predetermined timing for each cylinder and synchronized with the engine rotation, to thereby inject fuel controlled to a predetermined pressure. The fuel injection quantity is thus controlled by the pulse width of the drive pulse signal.

An automatic transmission 6 is fitted to the output side of the engine 1. The automatic transmission 6 comprises; a torque converter 7 connected to the output shaft of the engine 1, a gear type transmission 8 connected via the torque converter 7, and an actuator section 9 for controlling the engagement and disengagement of the various speed change elements in the gear type transmission 8.

In order to control the throttle valve 3 and the fuel injectors 5, signals from various sensors in addition to the air flow meter 4, are input to the control unit 10.

For the various sensors there is provided an accelerator sensor 11 for detecting the accelerator opening ACC (the amount that the accelerator pedal is pressed).

Moreover, there is provided a vehicle speed sensor 12 which takes a rotation signal from the output shaft of the automatic transmission 6, to thereby detect the vehicle speed VSP.

Furthermore, there is provided a crank angle sensor 13 for outputting a signal synchronized with the crank angle of the engine 1, to thus enable detection of the engine rotational speed Ne.

Additionally there is provided a turbine rotation sensor 14 which takes a rotation signal from the output shaft of the torque converter 7 (input shaft to the gear type transmission 8) in the automatic transmission 6, to thereby detect the turbine rotation speed Nt.

Figure 3:
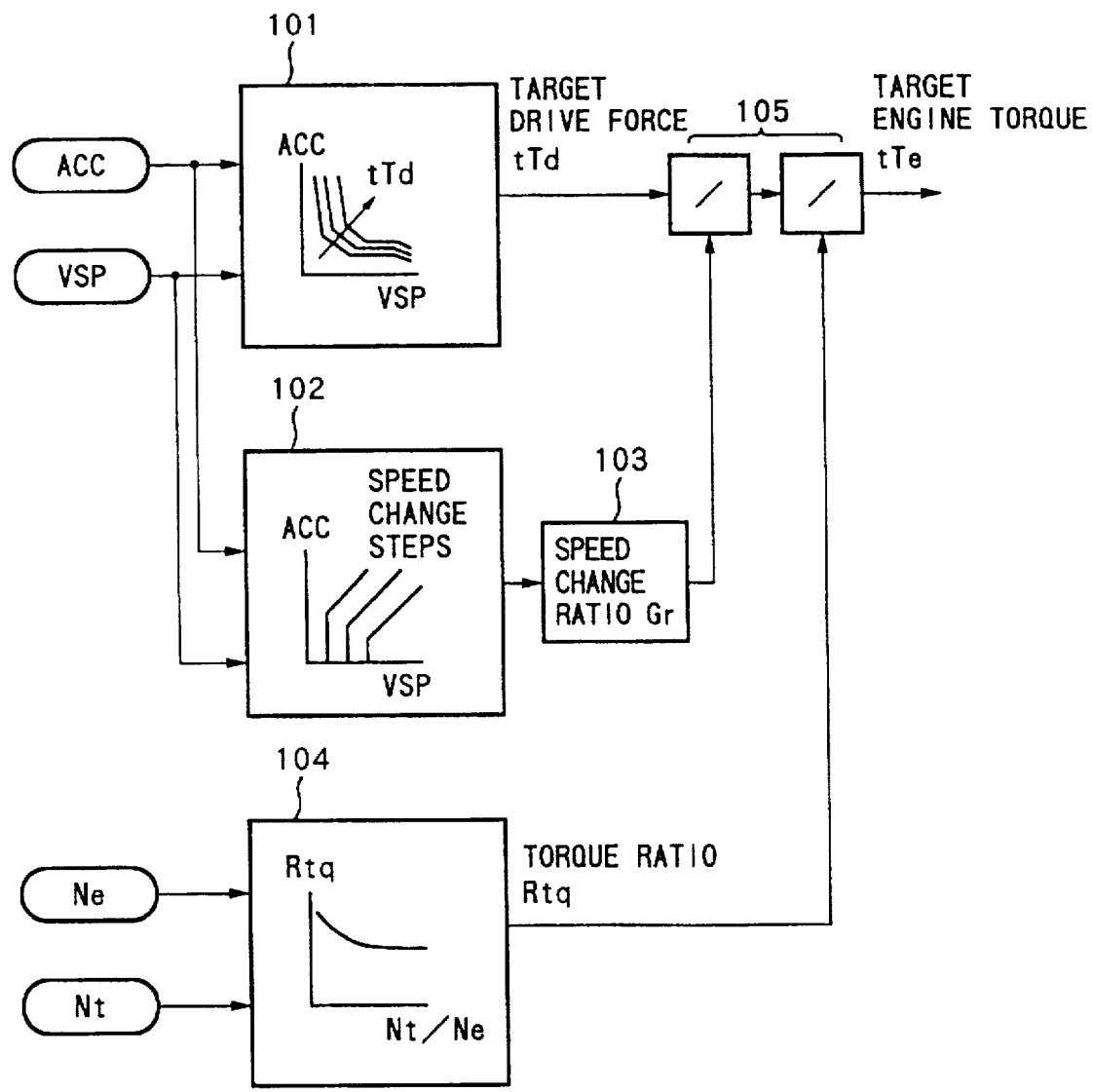
FIG. 3 is a block diagram for computing target engine torque.
Figure 4:
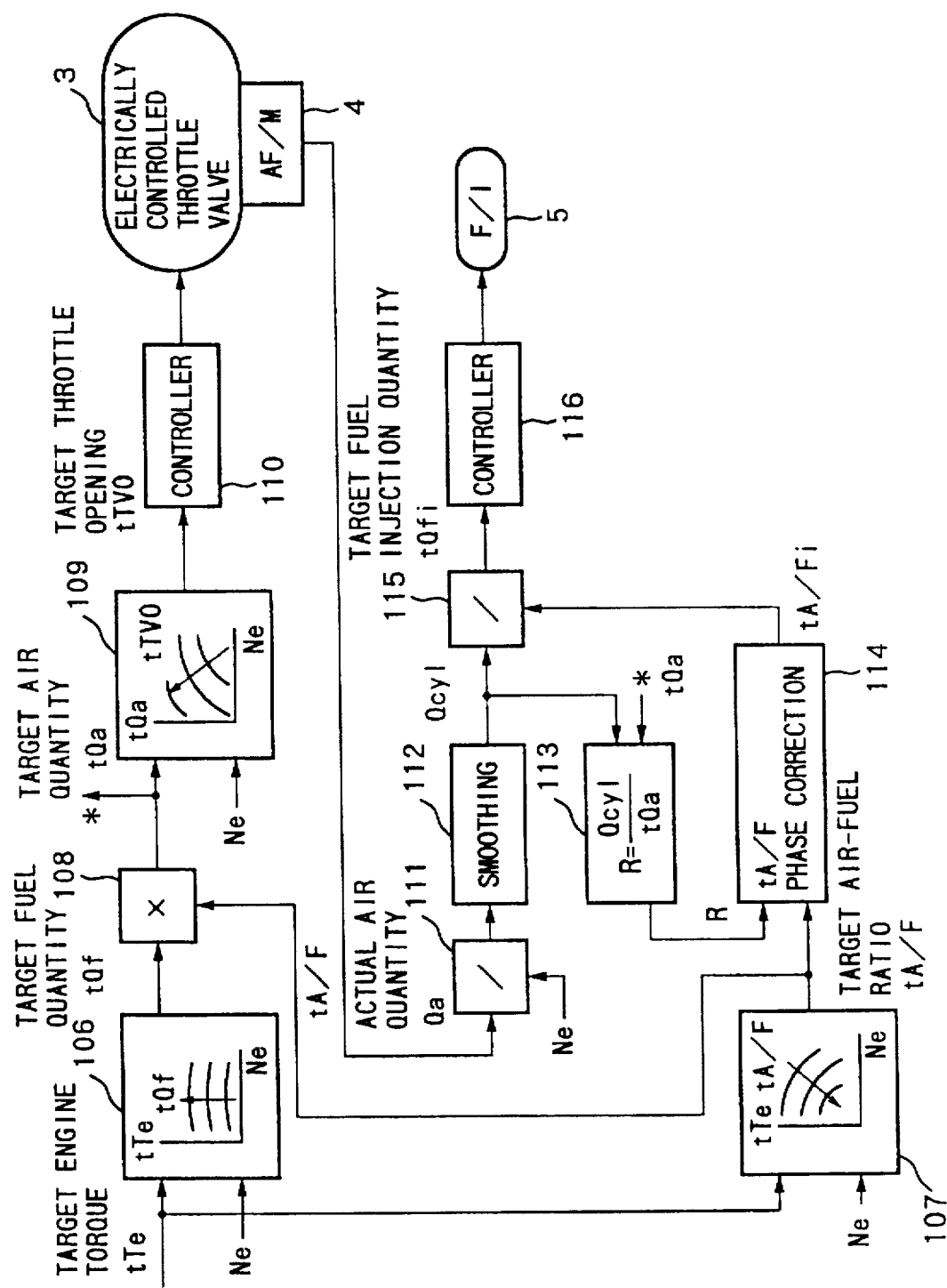
FIG. 4 is a block diagram for controlling throttle opening and fuel injection quantity.

The control unit 10 takes the signals from the respective sensors, and carries out computational processing (torque demand control) according to the control block diagrams of FIG. 3 and FIG. 4, using a microcomputer incorporated therein, to thereby control the throttle opening of the throttle valve 3, and the fuel injection quantity from the fuel injectors 5.

FIG. 3 is a block diagram for computing target engine torque.

A target drive force setting device 101 takes inputs of the accelerator opening ACC and the vehicle speed VSP, looks up a map in which vehicle target drive forces tTd have been previously set corresponding to these, and outputs a target drive force tTd.

A speed change computing device 102 takes inputs of the accelerator opening ACC and the vehicle speed VSP, looks up a map in which speed change steps have been previously set corresponding to these, and outputs a speed change step. Then, a speed change ratio output device 103 outputs a speed change ratio Gr corresponding to the speed change step.

A torque converter torque ratio computing device 104 takes inputs of the engine rotational speed Ne (torque converter input shaft rotational speed) and the turbine rotational speed Nt (torque converter output shaft rotational speed), looks up a map in which torque converter torque ratios Rtq have been previously set corresponding to speed ratios (Nt/Ne) of these, and outputs a torque converter torque ratio Rtq.

A target engine torque computing device 105 comprises two analogue dividers which divide the vehicle target drive force tTd by the speed change ratio Gr and then by the torque converter torque ratio Rtq according to the following equation, to compute a target engine torque tTe.

$$tTe=tTd/(Gr \times Rtq)$$

FIG. 4 shows a block diagram for a throttle opening and fuel injection quantity control, for realizing the target engine torque.

A target fuel quantity setting device 106 takes inputs of the target engine torque tTe and the engine rotational speed Ne, looks up a map in which target fuel quantities tQf have been previously set corresponding to these, and outputs a target fuel quantity tQf.

A target air-fuel ratio setting device 107 takes inputs of the target engine torque tTe and the engine rotational speed Ne, looks up a map in which target air-fuel ratios tA/F have been previously set corresponding to these, and outputs a target air-fuel ratio tA/F.

A target air quantity computing device 108 comprises an analogue multiplier which multiplies the target fuel quantity tQf by the target air-fuel ratio tA/F according to the following equation, to compute a target air quantity tQa.

$$tQa=tQf \times tA/F$$

A target throttle opening computing device 109 takes inputs of the target air quantity tQa and the engine rotational speed Ne, looks up a map in which target throttle openings tTVO have been previously set corresponding to these, and outputs a target throttle opening tTVO.

A throttle control device 110 then step drives a step motor using a command signal corresponding to the target throttle opening tTVO, to control the throttle valve 3 so as to give the target throttle opening tTVO.

An actual air quantity Qa controlled by the throttle valve, is detected by the air flow meter 4 serving as an actual air quantity detection device.

An actual air quantity conversion device 111 comprises an analogue divider which divides the actual air quantity Qa detected by the air flow meter 4 serving as the actual air quantity detection device by the engine rotational speed Ne according to the following equation, to compute an actual air quantity QTH per unit rotation.

$$Q_{TH}=Qa/Ne$$

An actual air quantity smoothing device 112 smoothes (averages) the actual air quantity QTH per unit rotation over a time-lag of first order, and computes a value Qcyl (cylinder charge air quantity) corresponding to the air quantity charged into the cylinder, according to the following equation:

$$Qcyl=P \times Q_{TH}+(1-P) \times Qcyl$$

where P is a smoothing constant ranging from 0~1.

A ratio computing device 113 computes a ratio R of the cylinder charge air quantity Qcyl to the target air quantity tQa(R=Qcyl/tQa).

A target air-fuel ratio correction device 114 takes inputs of the target air-fuel ratio tA/F, and the ratio R of the actual air quantity (cylinder charge air quantity) to the target air quantity, and computes a post correction target air-fuel ratio tA/Fi, according to the following equation:

$$tA/Fi=tA/Fi+\Delta tA/F \times R$$

where ΔtA/F is the step change amount when the target air-fuel ratio tA/F is changed stepwise.

A target fuel injection quantity computing device 115 comprises an analogue divider which divides the cylinder charge air quantity Qcyl by the target air-fuel ratio tA/Fi after phase correction, to compute a target fuel injection quantity tQfi.

$$tQfi=Qcyl/tA/Fi$$

More specifically, initially a conversion coefficient K for the fuel injection quantity, is computed based on the post correction target air-fuel ratio tA/Fi, according to the following equation:

$$K=1/(tA/Fi \times \rho \times Qsta)$$

where ρ is the fuel density and Qsta is the injector static flow rate.

The cylinder charge air quantity Qcyl is then multiplied by the conversion coefficient K to compute the target fuel injection quantity tQfi, according to the following equation:

$$tQfi=Qcyl \times K$$

A fuel injection control device 116 drives the fuel injectors 5 by a drive pulse signal of a pulse width corresponding to the target fuel injection quantity tQfi, to control the fuel injectors 5 to give the target fuel injection quantity tQfi.

Figure 5:
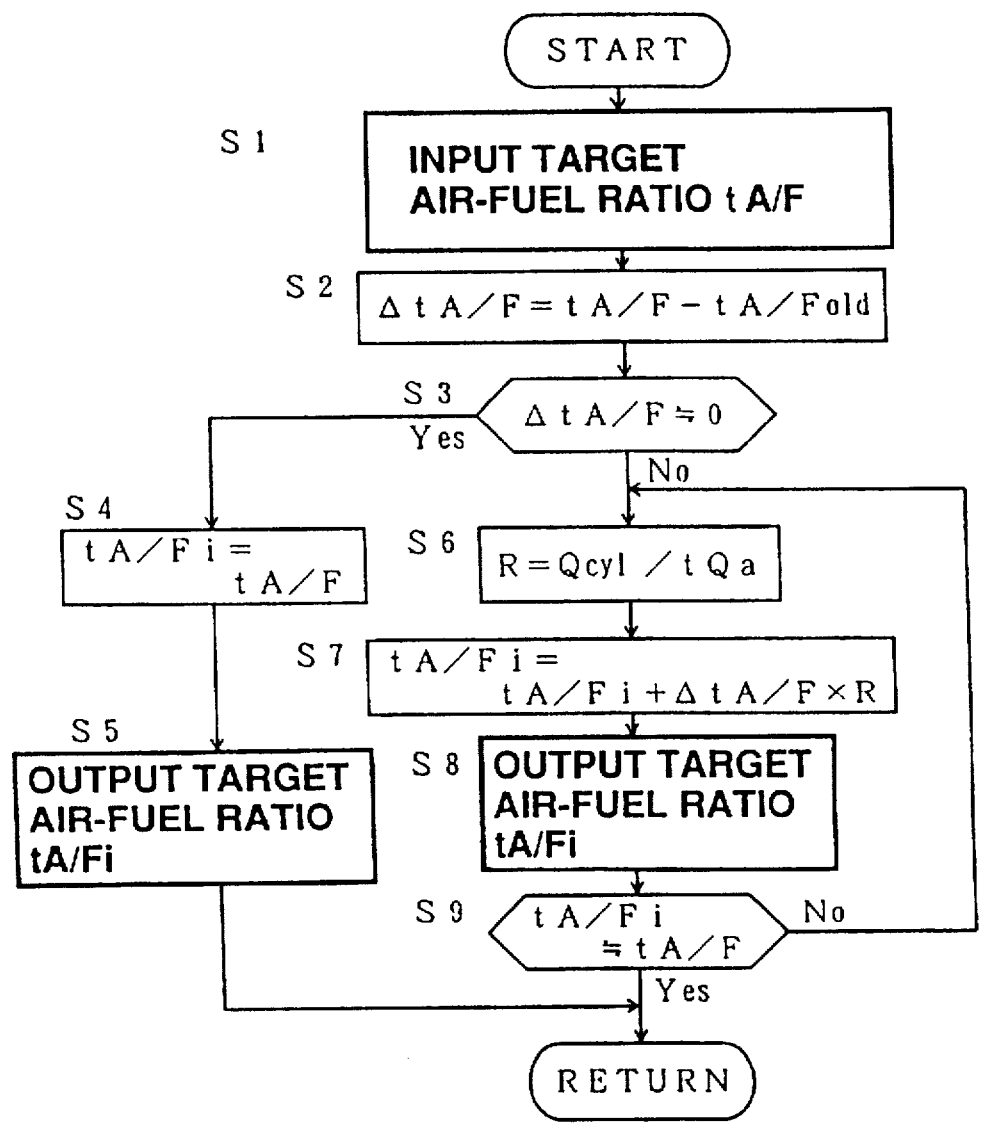
FIG. 5 is a flow chart for phase correction of the target air-fuel ratio.

The operation of the beforementioned target air-fuel ratio correction device 114 will now be described in more detail with reference to the flow chart of FIG. 5.

In step 1 (indicated by S1 in the figures, with subsequent steps indicated similarly), a target air-fuel ratio tA/F is input.

In step 2, a previous target air-fuel ratio tA/Fold is subtracted from the current target air-fuel ratio tA/F, to compute a step change amount ΔtA/F for the target air-fuel ratio.

$$\Delta tA/F=tA/F-tA/Fold$$

In step 3, it is judged if the step change amount ΔtA/F for the target air-fuel ratio is approximately zero.

If ΔtA/F is approximately zero, steps 4 and 5 are executed.

In step 4, the post correction target air-fuel ratio tA/Fi is made equal to tA/F, then in step 5 the post correction target air-fuel ratio tA/Fi is output, and the routine terminates.

When ΔtA/F is not approximately zero, steps 6 through 9 are executed.

In step 6, the target air quantity tQa and the cylinder charge air quantity Qcyl are input, and their ratio R computed as R=Qcyl/tQa.

Then in step 7, the product of the step change amount ΔtA/F for the target air-fuel ratio and the ratio R of the actual air quantity (cylinder charge air quantity) to the target air quantity, is added to the current post correction target air-fuel ratio tA/Fi, to update the post correction target air-fuel ratio tA/Fi according to the following equation:

$$tA/Fi=tA/Fi+\Delta tA/F \times R$$

Then in step 8, the post correction target air-fuel ratio tA/Fi is output.

In step 9 it is judged if the post correction target air-fuel ratio tA/Fi is approximately equal to the final target air-fuel ratio tA/F.

When the result gives tA/Fi approximately equal to tA/F, the routine is terminated, while when tA/Fi is not approximately equal to tA/F, steps 6 through 9 are repeated.

Figure 6:
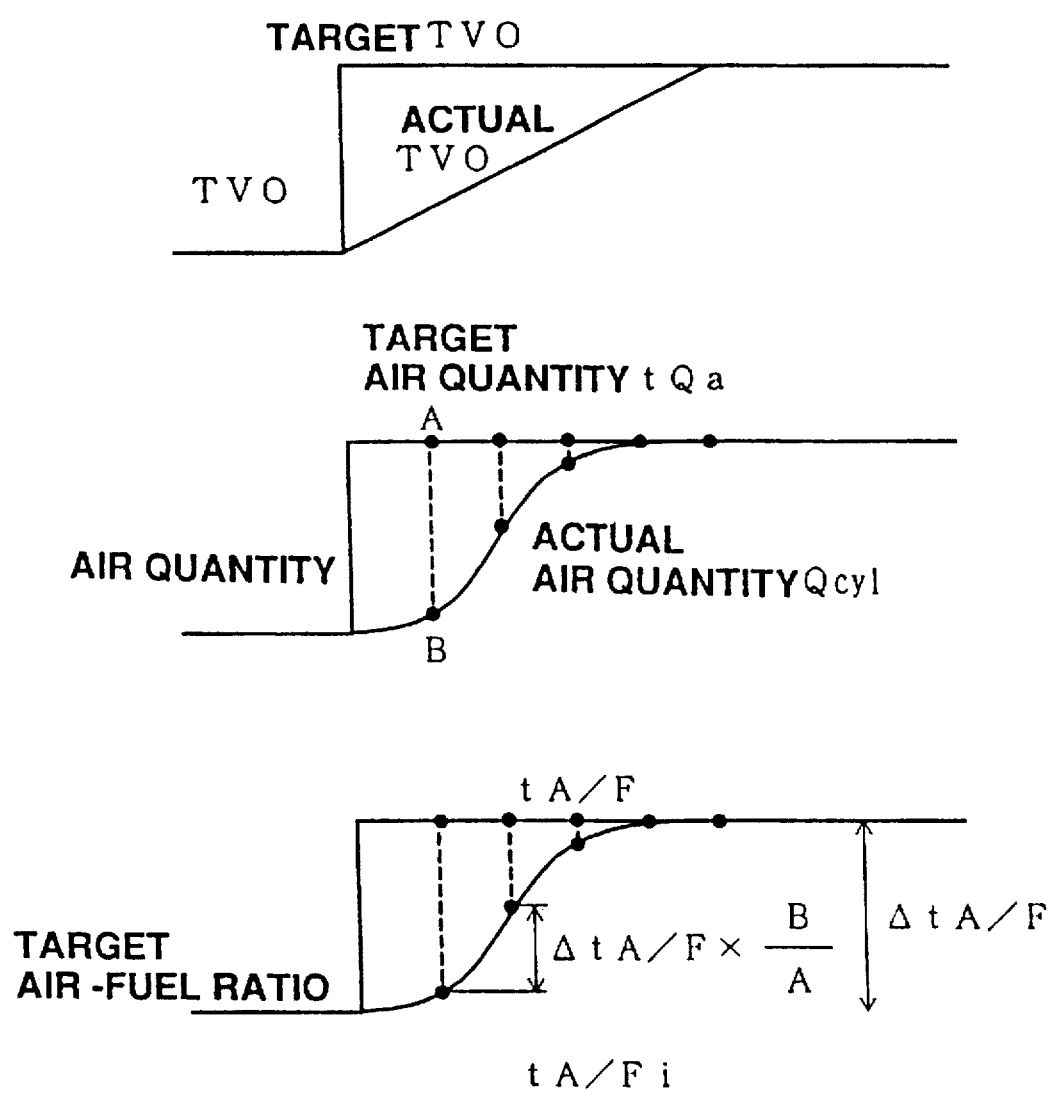
FIG. 6 is a time chart for phase correction of the target air-fuel ratio.

FIG. 6 shows the situation for setting of the post correction target air-fuel ratio tA/Fi. Erroneous control is prevented by matching the phases of the actual air quantity Qcyl (the cylinder charge air quantity) and the target air-fuel ratio tA/Fi.

Figure 10:
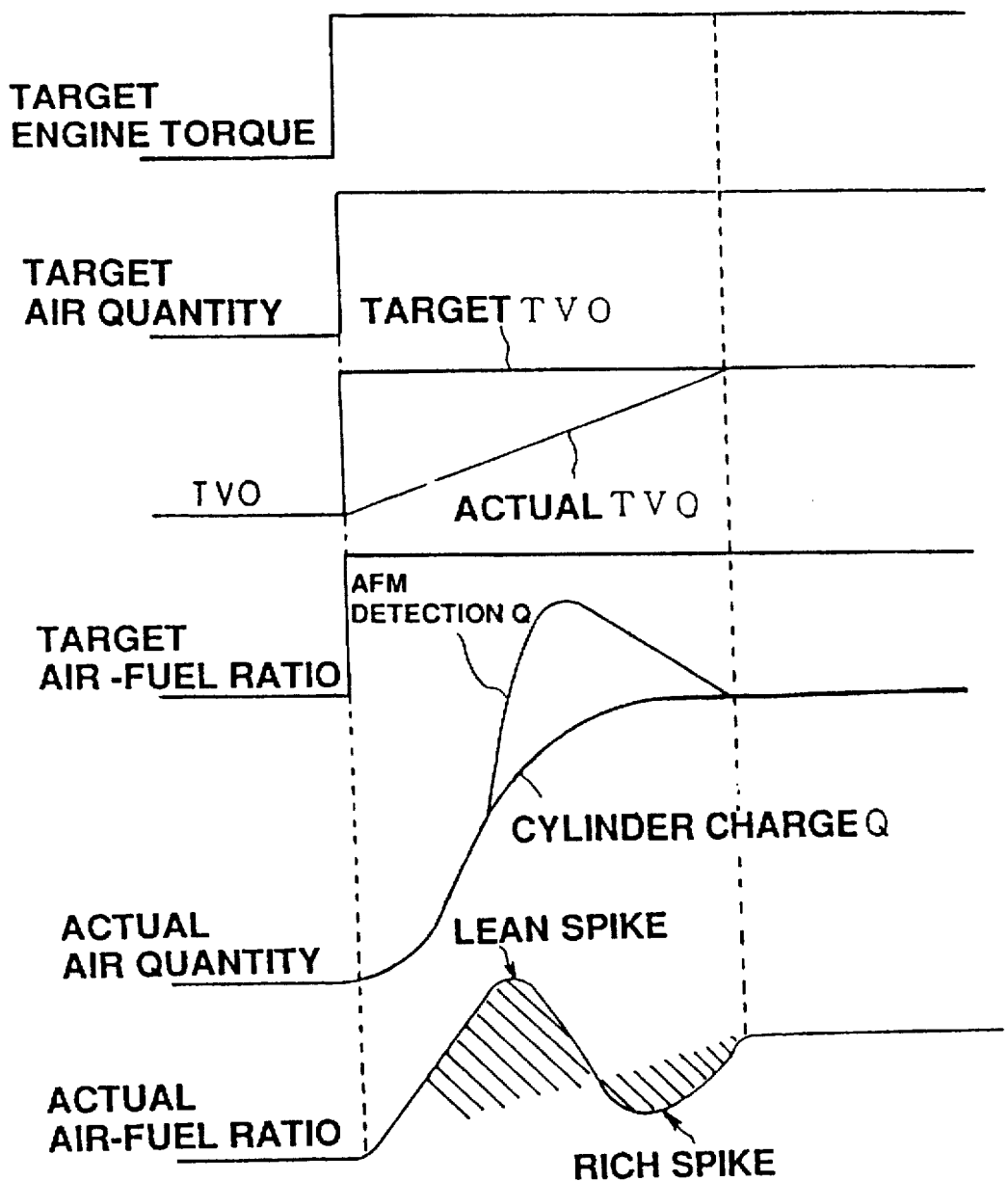
FIG. 10 is a time chart illustrating heretofore encountered problems.

More specifically, if as shown in FIG. 10, the target engine torque is changed in steps, for example to increase, and the target air quantity is changed in steps to follow this change, a response delay occurs for the actual throttle opening (actual TVO) relative to the target throttle opening (target TVO). Hence the actual air quantity at this time does not achieve the target air quantity.

Therefore, with the conventional arrangement, even though the target fuel injection quantity is determined and controlled from the actual air quantity and the target air-fuel ratio (without correction), then as shown in FIG. 10, a lean spike occurs in the actual air-fuel ratio due to the response delay of the electrically controlled throttle valve and collector error, followed by a rich spike due to air flow meter overshoot. Hence due to this excessive or deficient fuel injection quantity, the target engine torque cannot be achieved.

On the other hand, with the present invention, the target air-fuel ratio is corrected based on the relationship between the actual air quantity and the target air quantity, and by matching the phases of the actual air quantity and the target air-fuel ratio, then erroneous control of the fuel injection quantity can be prevented. Hence the target engine torque can be realized even during transition operation.

Next is a description of another embodiment of the invention.

With the beforementioned embodiment, the target air-fuel ratio was corrected by the ratio of the actual air quantity to the target air quantity. However with this embodiment, the target air-fuel ratio is corrected using the ratio of the actual throttle opening to the target throttle opening.

Therefore, the system diagram of FIG. 2 and the control block diagram of FIG. 3 need not be changed. However the control block diagram of FIG. 4 is changed to the control block diagram of FIG. 7, and the flow chart of FIG. 5 is changed to the flow chart of FIG. 8.

The differences will now be described.

Figure 7:
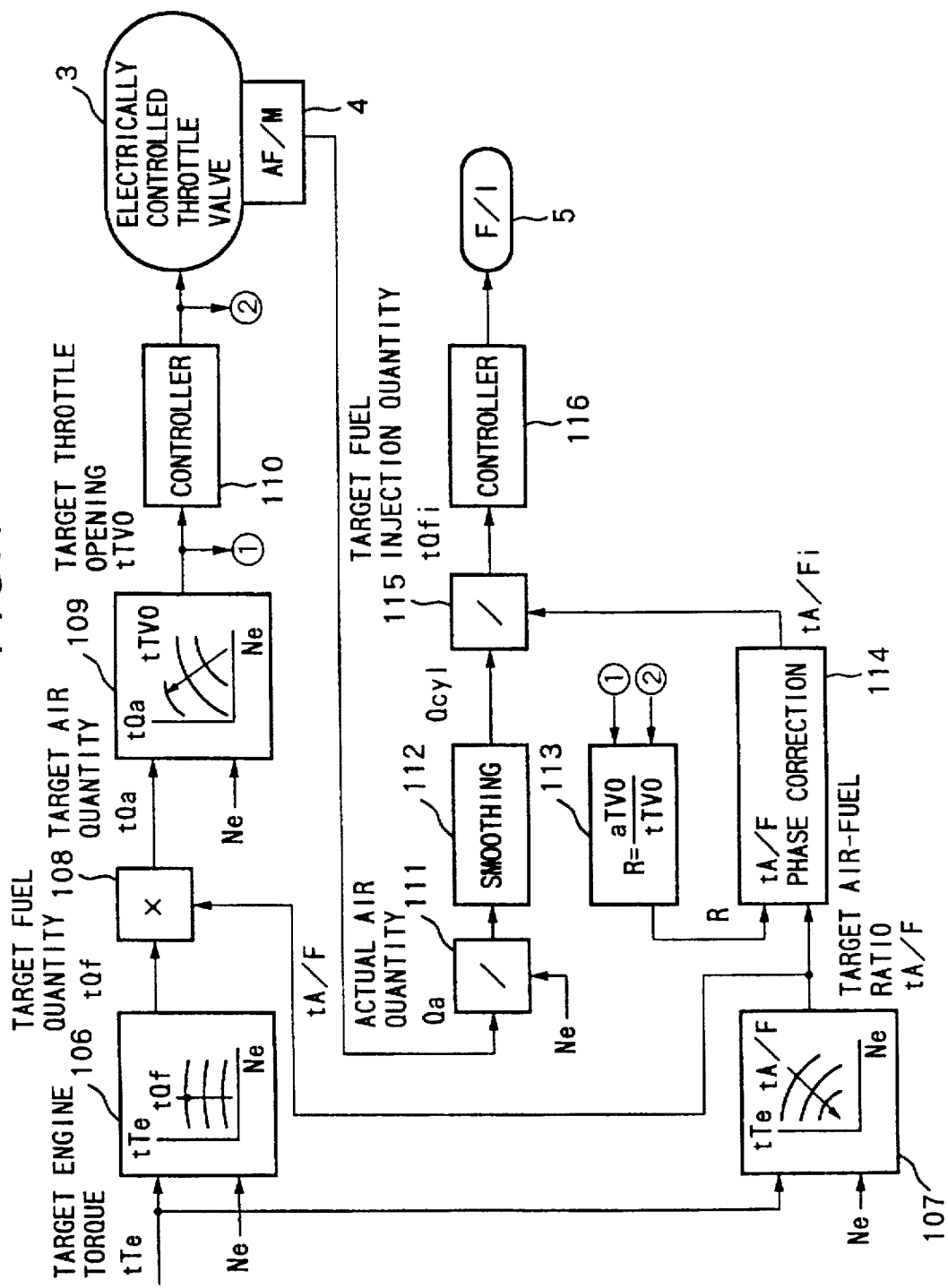
FIG. 7 is block diagram for controlling throttle opening and fuel injection quantity in another embodiment.

In FIG. 7, a ratio computing device 113 computes a ratio R of an actual throttle opening aTVO to the target throttle opening tTVO, as R=aTVO/tTVO.

Since the stepping motor for the throttle valve is driven in steps by the command signal corresponding to the target throttle opening tTVO in the throttle control device 110, then provided there is no loss of synchronism, the actual throttle opening aTVO can be known from the command signal (step position). Hence this command signal is used. Of course a sensor may be provided to detect the actual throttle opening aTVO.

A target air-fuel ratio correction device 114 takes inputs of the target air-fuel ratio tA/F and the ratio R of the actual throttle opening to the target throttle opening, and computes a post correction target air-fuel ratio tA/Fi according to the following equation:

$$tA/Fi = tA/Fi + \Delta tA/F \times R$$

where $\Delta tA/F$ is the step change amount when the target air-fuel ratio tA/F is changed stepwise.

Figure 8:
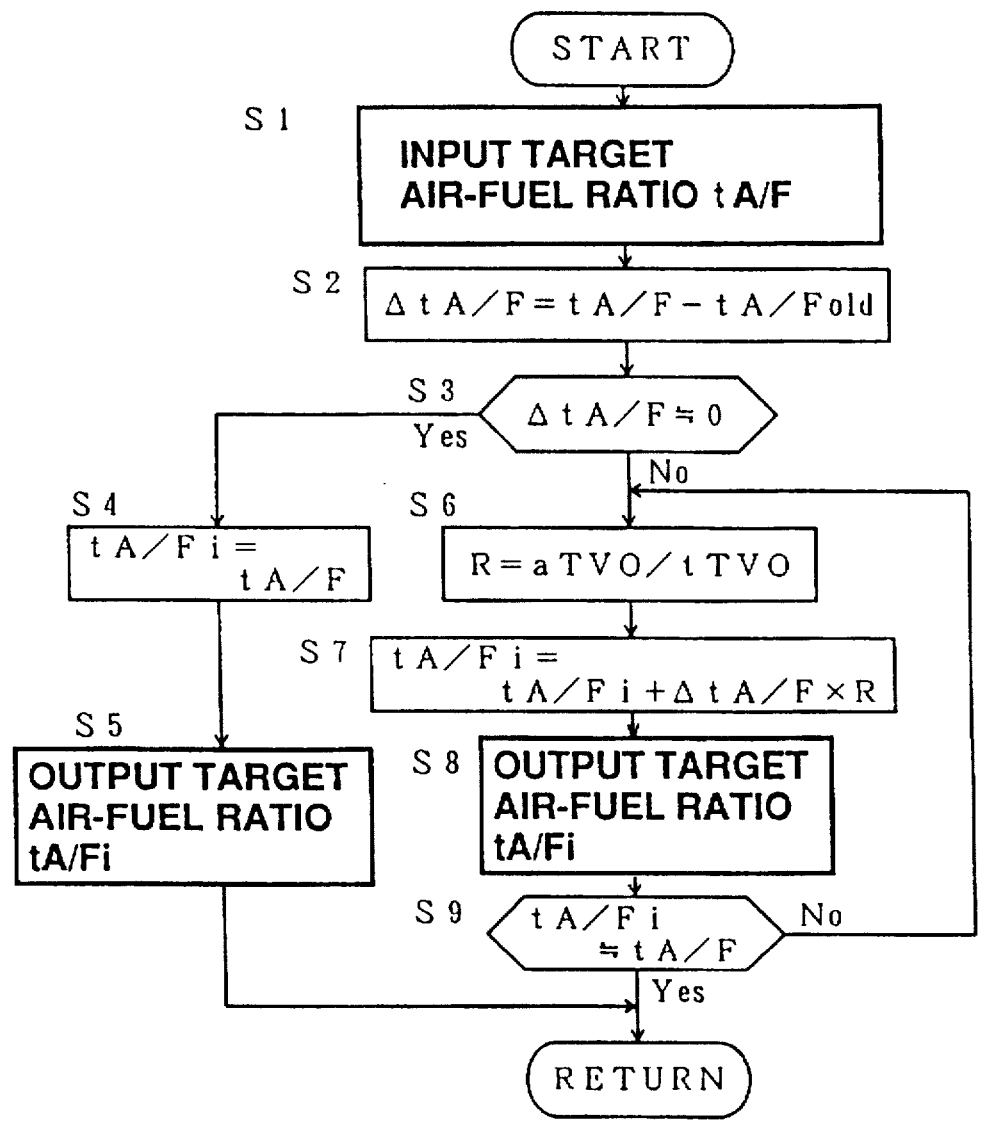
FIG. 8 is a flow chart for phase correction of the target air-fuel ratio in the embodiment of FIG. 7.

In FIG. 8, in step 6, the target throttle opening tTVO and the actual throttle opening aTVO are input, and their ratio R computed as R=aTVO/tTVO.

Then in step 7, the product of the step change amount $\Delta tA/F$ of the target air-fuel ratio and the ratio R of the actual throttle opening to the target throttle opening, are added to the current post correction target air-fuel ratio tA/Fi to update the post correction target air-fuel ratio tA/Fi according to the following equation:

$$tA/Fi = tA/Fi + \Delta tA/F \times R$$

Figure 9:
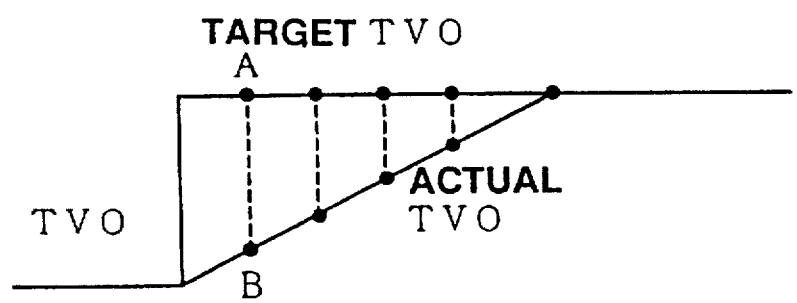
FIG. 9 is a time chart for phase correction of the target air-fuel ratio in the embodiment of FIG. 7.
Figure 9:
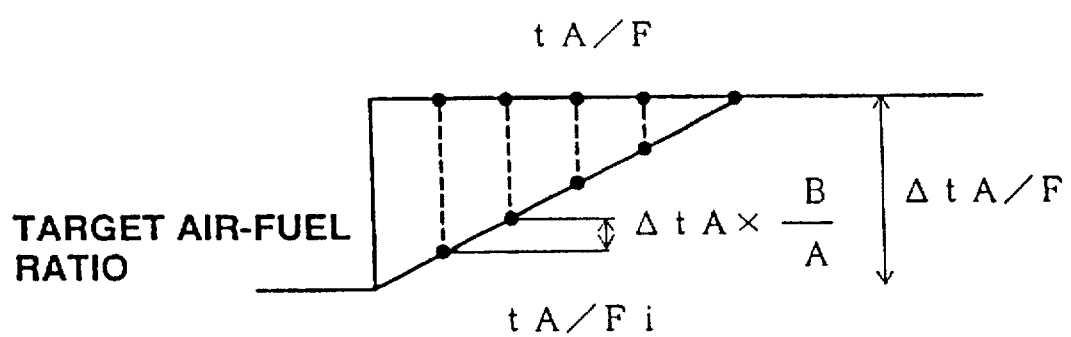

FIG. 9 shows the situation for setting of the post correction target air-fuel ratio tA/Fi. Erroneous control is prevented by matching the phases of the actual throttle opening aTVO (actual TVO) and the target air-fuel ratio tA/Fi.

In the case of correction using the throttle opening, since a slight error occurs due to changes in air pressure and the like, then for accuracy, the beforementioned embodiment is superior.

With the present invention as described above, in cases when at the time of a change in the target engine torque, this is accompanied by a change in the target air-fuel ratio, then by correcting the target air-fuel ratio based on a relationship (in particular the ratio) between the actual air quantity and the target air quantity to thereby match the phases of the actual air quantity and the target air-fuel ratio, erroneous control of the fuel injection quantity can be prevented, with the effect that the target engine torque can be realized even during transition operation. Industrial applicability is thus significant.

Moreover, if instead of correction based on the relationship between the actual air quantity and the target air quantity, correction is based on the relationship between the actual throttle opening and the target throttle opening to thereby match the phases of the actual throttle opening and the target air-fuel ratio, approximately the same effect can be obtained.

What is claimed is:

1. An engine control apparatus for controlling throttle opening and fuel injection quantity in order to realize a target engine torque, said engine control apparatus comprising:

target fuel quantity setting means for setting a target fuel quantity based on the target engine torque;

target air-fuel ratio setting means for setting a target air-fuel ratio based on the target engine torque;

target air quantity computing means for computing a target air quantity from the target fuel quantity and the target air-fuel ratio;

target throttle opening computing means for computing a target throttle opening based on the target air quantity;

throttle control means for controlling a throttle valve to give the target throttle opening;

actual air quantity detection means for detecting an actual air quantity controlled by said throttle valve;

target fuel injection quantity computing means for computing a target fuel injection quantity from the actual air quantity and the target air-fuel ratio; and fuel injection control means for controlling a fuel injector to give the target fuel injection quantity, and also including;

target air-fuel ratio correction means for correcting the target air-fuel ratio input to said target fuel injection quantity computing means, based on a relationship between the actual air quantity and the target air quantity.

2. An engine control apparatus according to claim 1, wherein said relationship between the actual air quantity and the target air quantity is a ratio between the actual air quantity and the target air quantity.

3. An engine control apparatus according to claim 1, wherein the target air-fuel ratio correction means, at the time of changing the target air-fuel ratio from said target air-fuel ratio setting means, changes a post correction target air-fuel ratio tA/Fi based on a change amount $\Delta tA/F$ thereof and a ratio R of the actual air quantity to the target air quantity, according to the equation:

$$tA/Fi = tA/Fi + \Delta tA/F \times R$$

4. An engine control apparatus according to claim 1, wherein an actual air quantity smoothing means is provided for smoothing the actual air quantity detected by said actual air quantity detection means over a time-lag of first order, and converting this to a value corresponding to a cylinder charge air quantity.

5. An engine control apparatus according to claim 1, wherein with said target air-fuel ratio correction means, instead of correction based on the relationship between the actual air quantity and the target air quantity, correction is based on a relationship between the actual throttle opening and the target throttle opening.

* * * * *